Oct. 20, 1942.    D. M. POTTER    2,299,406
FLOWMETER
Filed May 8, 1941    2 Sheets-Sheet 1

INVENTOR
DAVID M. POTTER
BY
Cousins+Cousins
ATTORNEYS

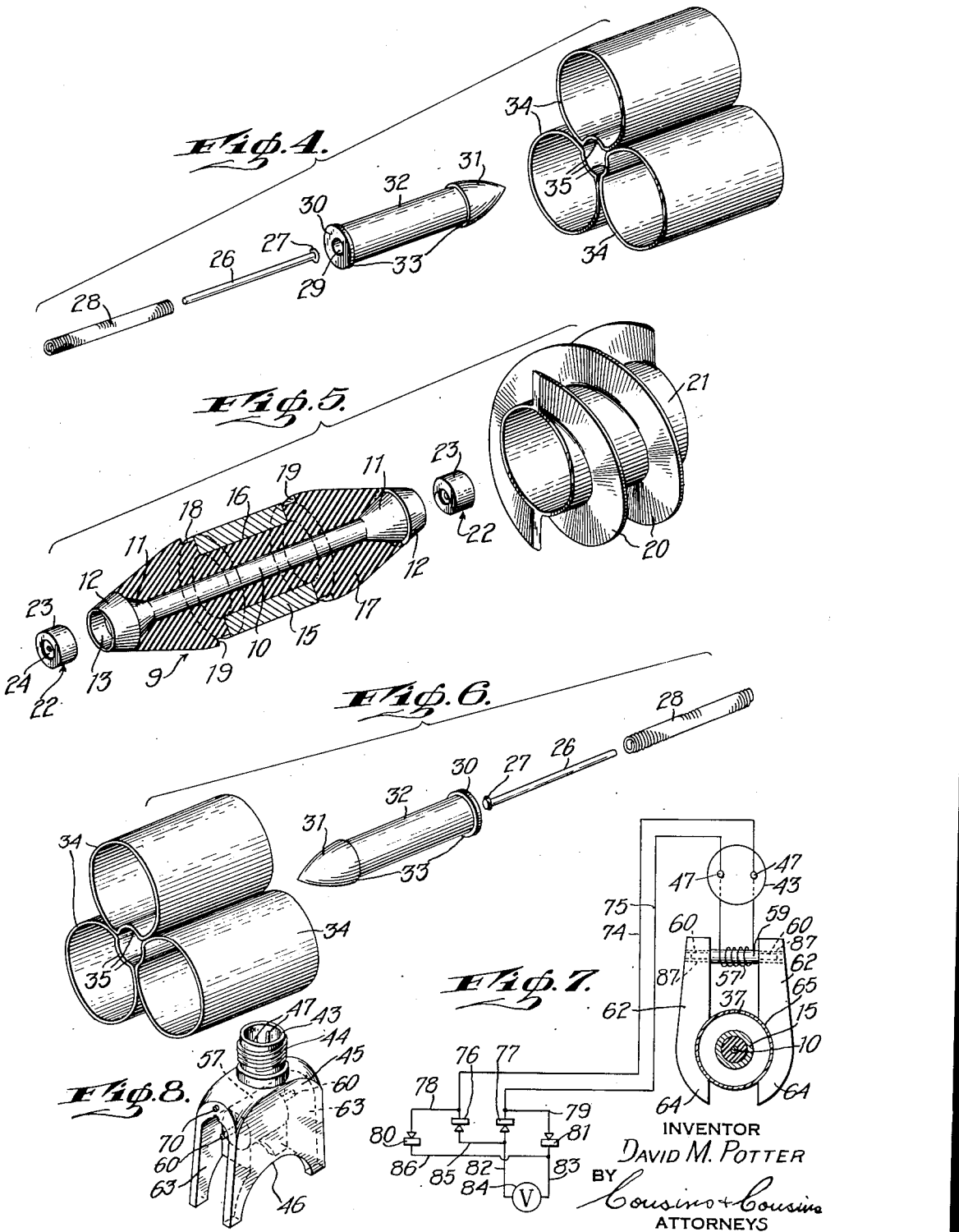

Patented Oct. 20, 1942

2,299,406

UNITED STATES PATENT OFFICE 2,299,406

FLOWMETER

David M. Potter, Plainfield, N. J., assignor to Breeze Corporations, Inc., Newark, N. J.

Application May 8, 1941, Serial No. 392,423

13 Claims. (Cl. 73—231)

This invention relates to flowmeters, and while capable of general use, is particularly adapted for embodiment in flowmeters for measuring the rate of flow of either liquids or gases supplied through conduits to aircraft or other engines to operate the same.

In my co-pending application Serial No. 239,975, filed November 12, 1938, there is disclosed a flowmeter embodying a fluid actuated rotor located in a conduit and isolated from but capable, in conjunction with an exteriorly located stator, of generating electric current recordable to indicate the rate of flow of fluid through the conduit.

The embodiment of the present invention chosen for disclosure herein is of the general type shown in said application Serial No. 239,975, and the principal object of the present invention is to provide an electric current generating type flowmeter of generally improved construction and operation such that it will not fail to function properly when subjected to vibration and other influences incident to and resulting from operation of an airplane, engine, or other equipment upon which it is installed.

In electric current generating type flowmeters such, for example, as used in feed lines for delivering liquid or gaseous fuel to internal combustion or other engines, the flowmeter is necessarily of small size and dimensions because of the limited space available to install the same in the feed line. Therefore, the current output of the flowmeter generator is very low and may be only 5 volts and 1 milliampere or below, under normal rating conditions. With such very low current output, even the slightest variation thereof will seriously affect the measuring function of the flowmeter, and it is therefore desirable to have for the same an electric current generator the relatively small output of which will not be subject to variations or fluctuations under any condition of operation. Accordingly, another object of the present invention is to provide an improved electric current generator of low output for flowmeters, which generator is in the form of a fine precision instrument such that the low current output thereof will be constant for any given condition of operation and thus insure constant accuracy of measurement of the rate of flow of liquid or gaseous fuel to internal combustion or other engines or equipment.

Other objects of the present invention are to provide an improved electric current generating type flowmeter capable of accurately measuring and indicating the rate of flow of gas, oil, gasoline, water or any fluid delivered through a conduit for use or consumption thereof; to provide an improved electric current generating type instrument for use as an air speed indicator, ship's log, or other purposes, as well as a flowmeter; to improve the construction and arrangement of parts of electric current generating type flowmeters to the end of facilitating quantity production thereof at low cost; to provide an improved permanent magnet type rotor and vibration damping means therefor; to provide improved fluid actuated flowmeter operating vane construction and mounting thereof in association with the permanent magnet type rotor; to provide improved and self-compensating bearings for a flowmeter rotor; and to provide an electric generator type flowmeter which does not require the use of bolts, screws, or the like for assembly and installation purposes, and which may be readily and quickly installed for use or removed for repairs or replacement.

The invention consists of the construction, combination and arrangement of parts, as herein illustrated, described and claimed.

In the accompanying drawings, forming part hereof, is illustrated one form of embodiment of the invention, in which drawings similar reference characters designate corresponding parts, and in which:

Figure 1 is an enlarged longitudinal sectional view of a flowmeter constructed in accordance with the present invention;

Figures 2 and 3 are transverse sectional views on lines 2—2 and 3—3, respectively, of Figure 1, looking in the directions indicated by the arrows;

Figure 4 is a detail exploded perspective view of rotor mounting means shown at the right of Figure 1;

Figure 5 is a detail exploded perspective view of a rotor, its bearings, and actuating vanes shown at the center of Figure 1;

Figure 6 is a detail exploded perspective view of rotor mounting means shown at the left of Figure 1;

Figure 7 is a wiring diagram for the flowmeter generator and current rectifying and indicating device connected therewith; and, Figure 8 is a perspective view, on a considerably reduced scale, of an insulator and an electric device shown in Figures 1, 2 and 3.

Figure 1:
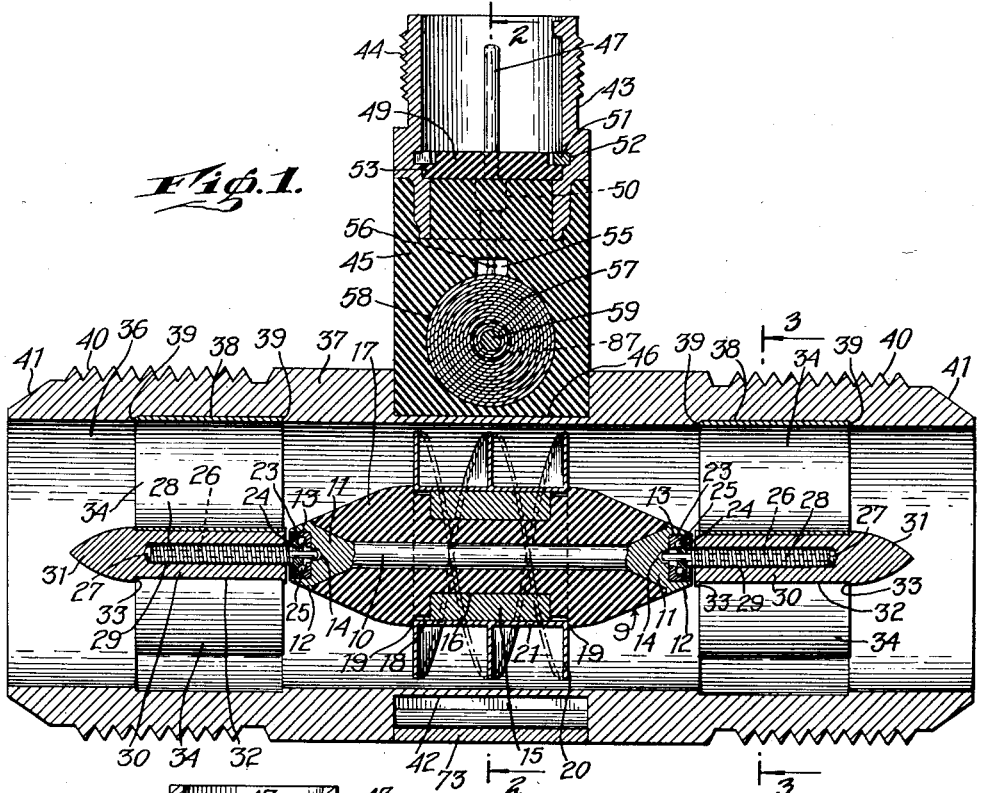
Figures 2, 3:
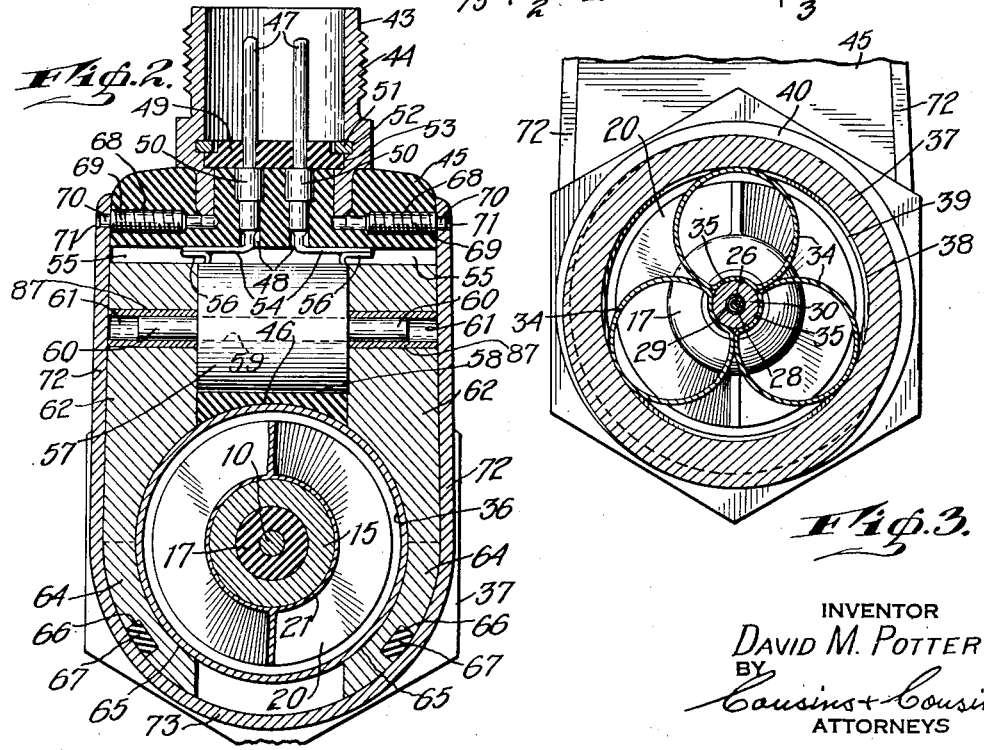

Referring to the drawings, the numeral 9 (Figure 5) indicates, broadly, a fluid actuated rotor having a shaft 10 made of any suitable metal and provided near its opposite ends with outwardly tapered annular vibration damping spool retaining means 11 terminating in inwardly or reversely tapered annular ends 12, proper, of said shaft. The ends 12 of the shaft 10 have bearing receiving recesses 13 (Figures 1 and 5) which, in turn, have annular spindle-end receiving recesses 14. The recesses 13 and 14 are concentric with the longitudinal axis of the shaft 10.

The rotor 9 is provided circumferentially thereof with a permanent magnet 15 ring-like in cross-section and, as herein shown, of cylindrical, tubular form. This magnet 15 may be made from conventional material or from any of the more recently developed magnetic materials which have unusually great magnetic stability. The magnet 15 is located in a relatively wide groove 16 of an annular vibration damping spool 17 fixed on the shaft 10 and made of rubber, plastic, composition, or other suitable material. In formation of the spool 17, the magnet 15, which is fixed on said spool and of considerably greater diameter than the shaft 10, is placed over the latter centrally thereof in a mold or other instrumentality employed for formation of the spool, and central, as well as co-axial relation of the magnet 15 with the shaft 10 will be maintained in any suitable manner or by any suitable means, in the mold.

The material employed to form the spool 17 is introduced into the mold, and said material flows between the shaft 10 and the magnet 15 and assumes, by reason of the shape of the mold, the form best shown in Figures 1 and 5 of the drawings. It will thus appear that formation of the grooves 16 and seating of the magnet 15 therein is accomplished through formation of the spool 17 on the shaft 10 as above described, and that the retaining means 11 of the shaft 10 engages the opposite ends of the spool in formation of the same on said shaft. Further, in formation of the spool 17, the shape of the mold will provide in said spool an annular groove 18 above the bottom of which the magnet 15 extends to a slight degree, and will also provide on the spool spaced annular shoulders 19 which are of slightly greater diameter than the magnet 15 and serve a purpose which will presently appear.

The rotor 9 has associated therewith and forming a part thereof spiral vanes 20 (Figures 1, 2, 3 and 5) which, upon impingement of fluid thereagainst, serve to rotate said rotor. These vanes 20 are provided with an elongated annular tubular hub 21 press-fitted on the magnet 15 between the shoulders 19 of the spool 17. The material of which the spool 17 is formed is yieldable to an extent sufficient to enable fitting of the hub 21 on the magnet 15 as stated. The vanes 20 and their hub 21 are preferably formed integrally from a single piece of aluminum or other metal machined with extreme accuracy on equipment for this purpose. In positioning the hub 21 and its vanes 20 on the magnet 15 the hub is slipped over the spool 17 thus compressing one or the other of the shoulders 19. When the hub 21 is properly located on the magnet 15, the compressed shoulder of the spool 17 springs outwardly and said hub is engaged by and between the shoulders 19 so that the hub and the vanes are held in proper position on said magnet and can not be accidentally displaced relative thereto. The shaft 10, the spool 17 and the vanes 20 with their hub 21 constitute the rotor 9 and, through formation and fitting of said elements together as described, they are maintained in fixed relation with respect to each other for rotation as a unit. The magnet 15, while embodied in and rotatable with the rotor 9 as hereinafter described, forms part of electric current generating means which will later be described in detail.

The shaft 10 has fitted in its bearing receiving recesses 13, small ball bearings indicated broadly at 22 (Figure 5) which are of minute dimensions and extremely accurate construction. These bearings are of a well known type, and include outer and inner raceways 23 and 24, respectively, and balls 25 therebetween (Figures 1 and 5). The outer raceways 23 are press fitted in the recesses 13, and means are provided to retain the inner raceways 24 in said outer raceways. The rotor 9, constructed as above described, is mounted in the flowmeter upon devices that are preferably constructed and arranged as follows.

Extending through openings formed in the bearing raceways 23 and 24 centrally thereof, are the inner ends of small spindles 26 (Figures 1, 3, 4 and 6) that also extend into the recesses 14 of the shaft 10. The rotor 9 is thus mounted for anti-friction rotation thereof upon the spindles 26. Mounted on said spindles between small annular heads 27 thereof and the inner raceway 24 of the bearings 22, are small coil springs 28. The spindles 26 and the expansion springs 28 extend within small elongated annular bores 29 of elongated annular spindle carriers 30 having outer tapered streamlined terminals 31. The spindle carriers 30 have formed therein, circumferentially thereof, relatively wide annular grooves 32 and spaced annular shoulders 33 at opposite sides thereof.

The spindle carriers 30 have disposed about them spaced series of thin metallic vane forming elements 34, ring-like in cross-section and, as herein shown, of elongated cylindrical tubular form. The elements 34 have formed therein longitudinally thereof elongated arcuate shaped recesses 35 (Figures 3, 4 and 6) which engage the annular walls of the spindle carrier recesses or grooves 32. The annular shoulders 33 of the carriers 30 engage opposite ends of the elements 34 (Figure 1) and said elements, together with the carriers 30 and the spindles 26, serve to mount the rotor 9 in the annular bore 36 of a housing 37 (Figures 1, 2 and 3) forming, for example, part of a conduit or feed line through which liquid or gaseous fuel is delivered to an airplane or other engine.

Accordingly, the housing 37, which is made of a non-magnetic material, is provided in the annular bore 36 thereof with spaced, relatively wide annular grooves 38 (Figures 1 and 3) and spaced annular shoulders 39 adjacent thereto. The elements 34 are slightly deformed diametrically thereof and sprung between the annular walls of the grooves 32 of the carriers 30 and the annular walls of the housing grooves 38 so that the housing shoulders 39, as well as the carrier shoulders 33, engage opposite ends of the elements 34 to prevent accidental end-wise displacement of said elements, the carriers 30 and the rotor 9 in the bore 36 of the housing 37. The bearings 22 are, through provision of the spring-pressed spindles 26, self-compensating for wear due to continued rotation of the rotor 9, and this result is accomplished through the continuous inward pressure of the springs 28 on the inner raceways 24 of said bearings.

The openings through the elements 34 enable fluid to flow therethrough and, due to mounting of said elements as described, said openings extend in the direction of the length of the housing bore 36 through which the fluid flows when the flowmeter is installed and in operation. In this manner, the elements 34 act as fluid straightening vanes such as would eliminate swirling or turbulence of fluid fuel flow resulting from bends or angles in a conduit in which the housing 37 is incorporated. Thus, with a flowmeter constructed in accordance with the present invention and incorporated in a conduit to measure the rate of flow of fluid therethrough, the rotor 9 would not be subjected to swirling or turbulence of fluid fuel flow because of elimination thereof by the fluid straightening vanes forming elements 34.

The housing 37 is provided with spaced sets of screw-threads 40, opposite beveled ends 41, and nuts (not shown) for engagement therewith whereby housing may be associated with and made a part of a fluid delivery conduit in the manner disclosed in application Serial 239,975 above referred to. The housing 37 is further provided centrally thereof about the rotor 9 and its magnet 15 and spiral vanes 20, with a relatively wide annular groove 42 (Figure 1) having a comparatively thin annular wall upon which is mounted the stator of a small electric current generator that includes the rotatable magnet 15. Said stator is preferably constructed as follows.

A metallic sleeve 43 (Figures 1, 2 and 8) having screw-threads 44 formed thereon, is secured in the top of a fixture 45 made of any preferred material. As herein shown, this fixture 45 (Figure 8) is made of insulating material and has an arcuate shaped base 46 which is fitted upon the thin annular wall of the groove 42 of the housing 37, the wide opposite side walls of said fixture engaging the opposite side walls of said groove. Extending into the sleeve 43 are terminal pins 47 which are fitted in counterbored openings 48 (Figure 2) formed in the fixture 45 at the top thereof. Fitted in the sleeve 43 and upon the top of the fixture 45, is a disk 49 (Figures 1 and 2) made preferably of insulating material. The terminal pins 47 extend upwardly into the sleeve 43 through openings in the disk 49, and said pins have enlarged annular portions 50 the tops of which are engaged by said disk to hold the pins 47 in position in the openings 48. The disk 49, in turn, is held in position by a spring ring 51 fitted in an annular groove 52 in the sleeve 43 and bearing upon an annular flange 53 of said disk.

The pins 47 have bent lower ends 54 (Figure 2) extending downwardly and at right angles to said pins within suitable grooves or openings 55 in the fixture 45. The pin ends 54, in turn, are soldered to the opposite ends 56 of a wire coil 57. This coil 57 (Figures 1, 2 and 7) constitutes a field winding for the generator, and said coil is arranged in an opening 58 in the fixture 45. The coil 57 has a core 59 of a high permeability metal the opposite ends 60 of which (Figure 2) extend outwardly from the opposite ends of said coil. The outwardly extending opposite ends 60 of the core 59 extend in sleeves 87 hereinafter referred to which, in turn, extend in openings 61 formed in pole pieces 62 transversely thereof. These pole pieces 62 (Figures 2 and 7) are fitted in slots 63 formed in opposite narrow sides of the fixture 45, said slots being clearly shown in Figure 8 of the drawings. The pole pieces 62 have field poles 64 in the inner opposite arcuate surfaces 65 of which engage the thin annular wall of the groove 42 of the housing 37. The field poles 64 are provided in their outer surfaces with slots 66 (Figure 2) in which are fitted rubber buffers 67.

The fixture 45 is provided therein near the top thereof with threaded openings 68 (Figure 2) having screws 69 engaged therein. The screws 69 are provided on their outer ends with pins 70 which extend into openings 71 of arms 72 of a metal yoke 73. This yoke 73 (Figures 1 and 2) is positioned in the groove 42 of the housing 37, and the arms 72 extend over the pole pieces 62 and the adjacent sides of the fixture 45. The yoke 73 thus serves to hold the fixture 45 and the parts carried thereby in position on the housing 37. By springing the arms 72 out of engagement with the pins 70, the yoke 73, the pole pieces 62, and the fixture 45 may be removed from the housing 37 for repair or replacement.

In assembling these parts upon the housing 37, the fixture 45 is placed in the groove 42 so that the arcuate base 46 of said fixture bears upon the annular wall of said groove. The pole pieces 62 are then positioned in the grooves 63 of the fixture 45 so that the ends 60 of the core 59, which extend in said grooves, are engaged in the sleeves 87 that are fitted in the openings 61 of said pole pieces. At the same time, the arcuate surfaces 65 of the field poles 64 are engaged with the thin annular wall of the groove 42, whereupon the yoke 73 is fitted in said groove upon the field poles 64, the pole pieces 62, and the adjacent sides of the fixture 45, and the pins 70 are engaged in the openings 71 of the yoke arms 72.

It will appear, from the foregoing, that the elements 15, 57, 59 and 62 comprise a small alternating current generator whose output, in either or both frequency and E. M. F. is proportional to the rate of flow of fluid flowing through the housing 37 and actuating the rotor 9 by impingement upon the vanes 20. Figure 7 of the drawings shows diagrammatically one arrangement by which the current developed by the generator may be measured to determine the rate of flow of the fluid. A plug (not shown) is connected with the terminal pins 47 and with wires 74 and 75, and is held in connected position by a threaded cap or nut (not shown) engaged with the threaded portion 44 of the plug 43. Wires 74 and 75 are connected with rectifiers 76 and 77 and with wires 78 and 79. The wires 78 and 79, in turn, are connected with rectifiers 80 and 81. The rectifiers 77 and 81 are connected by wires 82 and 83 with a volt meter 84, and the wires 82 and 83 are connected by wires 85 and 86 with the rectifiers 76 and 80.

The volt meter 84 may be calibrated in any suitable manner to indicate the rate of flow of fluid through the flowmeter. If, for example, the flowmeter is used for measuring gasoline flowing to the engine of an airplane, the voltmeter 84 may be calibrated in gallons per hour or in pounds of fluid per hour supplied to said engine. Rectifiers 76, 77, 80 and 81 are preferably of the copper oxide type. They convert the alternating current generated into direct current for supply thereof to the voltmeter 84. Said rectifiers provide full wave rectification of the power generated by the generator. The generator and the voltmeter have resistances such that the wires used for connecting them, regardless of the length thereof, will have no appreciable effect upon calibration of the instrument.

Certain flowmeter installations are subject to variations in temperature as, for example, in flowmeters for measuring the rate of flow of fluid such as gasoline the volume of which varies in accordance with variations in temperature. Therefore, to compensate for this there is, in accordance with the present invention, incorporated in the magnetic circuit of the generator, a material having a negative temperature coefficient of impedence which reduces the magnetic flux density as the temperature of the fluid increases, and increases the magnetic flux density as the temperature of the fluid decreases. As herein shown, the aforesaid material is incorporated in the magnetic circuit of the generator in the form of the sleeves 87 (Figures 2 and 7), said sleeves being preferably made of stainless steel having the aforesaid negative temperature co-efficient of impedence.

When measuring the rate of flow of fluid in gallons, no compensation for changes in temperature of the fluid is needed except a small amount to counteract the impedence change in the field poles 64 and other parts of the magnetic circuit due to temperature changes. In this case, the walls of the sleeves 87 will be relatively thin. When measuring the rate of flow of fluid in pounds, the compensation for changes in temperature of the fluid must be sufficient to counteract the impedence change in the magnetic circuit of the generator and also the change in magnetic flux density due to change in rotor speed with temperature. In this case the walls of the sleeves 87 will be relatively thick.

Having thus fully described the invention, what is claimed as new and desired to be secured by Letters Patent of the United States is:

1. In apparatus of the electric current generating type wherein the generated current is employed to measure the rate of flow of fluid through a conduit having a fluid actuated rotor therein, the combination with the conduit and the rotor, of electric current generating means associated with said conduit and said rotor and comprising a permanent magnet ring-like in cross-section mounted on the longitudinal center of the rotor co-axially therewith for rotation thereby.

2. In apparatus of the electric current generating type wherein the generated current is employed to measure the rate of flow of fluid through a conduit having a fluid actuated rotor therein, the combination with the conduit and the rotor, of electric current generating means associated with said conduit and said rotor, comprising a permanent magnet ring-like in cross-section mounted on the rotor co-axially therewith for rotation thereby, a pair of spaced pole pieces between which the conduit extends and engaged therewith exteriorly thereof opposite said magnet, and a wire coil interposed between said pole pieces and having a core connected therewith.

3. In apparatus of the electric current generating type wherein the generated current is employed to measure the rate of flow of fluid through a conduit having a fluid actuated rotor therein, the combination with the conduit and the rotor, of annular vibration damping means forming part of the rotor, and electric current generating means associated with the conduit and the rotor, comprising an annular permanent magnet ring-like in cross-section mounted on said vibration damping means co-axially with said rotor for rotation thereby.

4. In apparatus of the electric current generating type wherein the generated current is employed to measure the rate of flow of fluid through a conduit having a fluid actuated rotor therein, the combination with the conduit and the rotor, of electric current generating means associated with the conduit and the rotor, comprising a cylindrical tubular permanent magnet mounted on said rotor co-axially therewith, and spiral vane type fluid actuated means forming part of the rotor and mounted on said magnet to rotate the latter and said rotor.

5. In apparatus of the electric current generating type wherein the generated current is employed to measure the rate of flow of fluid through a conduit having a fluid actuated rotor therein, in combination with the conduit and the rotor, of electric current generating means associated with said conduit and rotor, said means comprising a pair of fixed pole pieces between which the conduit extends in superficial contact, a chambered fixture mounted on said conduit opposite said rotor and in which said pole pieces are fitted, a wire coil in said fixture, a core for said coil connected between said pole pieces, a yoke on said fixture arranged exteriorly of said pole pieces, and means to retain said yoke when assembled.

6. In apparatus of the electric current generating type wherein the generated current is employed to measure the rate of flow of fluid through a conduit having a fluid actuated rotor therein, the combination with the conduit and the rotor, of electric current generating means associated with said conduit and rotor and comprising a pair of spaced pole pieces between which the conduit extends and engaged therewith exteriorly thereof opposite the rotor, a fixture mounted on said conduit and in which said pole pieces are fitted, and a wire coil in said fixture having a core connected with said pole pieces, and a yoke extending over the conduit and having arms engaging said pole pieces and the fixture to hold them associated and in position upon said conduit.

7. A rotor for measuring apparatus of the electric current generating type, said rotor having an annular recess midway its length, and a permanent magnet of ring-like cross-section fixed in the recess circumferentially of said rotor.

8. A rotor for measuring apparatus of the electric current generating type, said rotor having annular vibration damping means and a permanent magnet of ring-like cross-section mounted on said vibration damping means.

9. A measuring apparatus rotor comprising an annular body of yieldable material having spaced annular shoulders, and vane type fluid actuated means fitted on said body between said shoulders.

10. A measuring apparatus rotor comprising a shaft having retaining means at opposite ends thereof and bearing receiving recesses in said ends, spring pressed bearings engaged in said recesses, an annular body on said shaft between said means, and vane type fluid actuated means fitted on said body.

11. In apparatus of the type wherein a rotor is mounted for fluid actuation thereof in a conduit, the combination with the rotor and the conduit, of anti-friction self-compensatory bearings fitted in recesses in opposite ends of the rotor, spindles extending through openings in the bearings centrally thereof, and carriers arranged in the conduit and having bores in which the spindles are mounted.

12. In apparatus of the type wherein a rotor is mounted for fluid actuation thereof in a conduit, the combination with the rotor and the conduit, of anti-friction bearings fitted in recesses in opposite ends of the rotor, spindles extending through openings in the bearings centrally thereof, carriers arranged in the conduit and having bores in which the spindles are mounted, and coil springs mounted on the spindles in said bores and engaged with said bearings to compensate for wear thereof incident to rotation of said rotor.

13. In measuring apparatus of the type wherein a rotor is mounted for fluid actuation thereof in a conduit, the combination with the rotor and the conduit, of cylindrical rotor mounting carriers in the conduit at opposite ends of said rotor and having annular grooves and spaced annular shoulders adjacent thereto, and spaced series of three thin metallic tubular elements supporting the carriers and rotor in the conduit and fitted in the annular carrier grooves between the carrier shoulders, said elements being provided longitudinally thereof in their peripheries with arcuate shaped recessed portions bearing against said carriers in said grooves.

DAVID M. POTTER.